Patented Sept. 18, 1945

2,384,812

UNITED STATES PATENT OFFICE 2,384,812

INSECTICIDAL TOXICANTS

Gerald H. Coleman, Wesley D. Schroeder, and Gerald A. Griess, Midland, Mich., assignors to The Dow Chemical Company, Midland, Mich., a corporation of Michigan No Drawing. Application June 17, 1942, Serial No. 447,438

5 Claims. (Cl. 167—24)

This invention relates to new insecticidal toxicants.

A co-pending application Serial No. 447,144, filed June 15, 1942 discloses and claims new amides having the formula

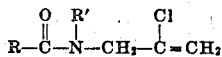

wherein R and R' each represents a hydrocarbon radical selected from the group consisting of alkyl, cycloalkyl, aryl, aralkyl, and alkenyl, and insecticidal compositions in which these compounds are employed as toxicants. The present invention is directed to a particular group of compounds falling within the scope of the foregoing formula which have been found particularly valuable as supplementary toxicants in combination with pyrethrin- and rotenone-containing products, and to compositions comprising such combinations of toxicants. The group of compounds to which the present application is limited are the amides prepared from N-cyclohexyl-2-chloroallyl amines having the following formula

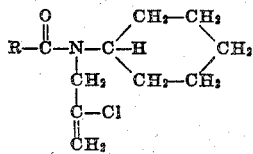

wherein R represents a hydrocarbon radical selected from the group consisting of alkyl, cycloalkyl, aryl, aralkyl and alkenyl.

The new compounds may be prepared by reacting N-cyclohexyl-2-chloroallylamine with an organic acid, acid anhydride or acid chloride. In such preparation, an organic reaction solvent such as toluene, benzene, xylene, etc. may be employed, if desired. Equimolecular amounts of reactants have been found to give satisfactory yields of the desired amides. Where an acid chloride is employed, it is sometimes advantageous to include a small amount of pyridine or other alkaline reacting material in the reaction mixture. When operating with a free acid, a condensing agent such as phosphorus trichloride is desirable. In preparations involving such low-boiling reactants as acetic anhydride, an excess of the latter may serve as the reaction solvent. Such practice permits the removal of water of reaction by distilling off the acetic acid as formed.

The reaction is preferably carried out at a temperature between about 40° C. and the boiling or decomposition temperature of the mixture. A convenient method of operation comprises mixing the reactants together at relatively low temperatures and thereafter heating the mixture to its boiling temperature and under reflux to complete the reaction. When the reaction is completed, the mixture may be treated with dilute aqueous sodium carbonate or other alkaline reacting material to neutralize traces of unreacted acid or acid products formed during the reaction. The crude products are then separated by extraction or decantation, washed with water, and fractionally distilled or crystallized to obtain the desired amide derivatives.

The N-cyclohexyl-2-chloroallyl amides have been found to be viscous, water-white oils or low-melting solids, insoluble in water and relatively soluble in many common organic solvents. When combined with pyrethrin and/or rotenone containing toxicant materials, these new amide compounds exert a synergistic effect whereby insecticidal toxicities of the mixtures are much greater than might have been predicted from a knowledge of the toxicities of the components thereof.

The following examples illustrate the invention but are not to be construed as limiting the same.

Example 1

34.7 grams (0.2 mol) of N-cyclohexyl-2-chloroallylamine, 17.2 grams (0.2 mol) of crotonic acid, and 125 grams of toluene were mixed together and heated to 50° C. with stirring. 13.7 grams (0.1 mol) of phosphorus trichloride was added to this reaction mixture portionwise and with stirring over a period of one hour with the temperature at 50°–55° C. The reaction mixture was then heated to its boiling temperature and under reflux for 8 hours, and thereafter mixed with 200 milliliters of water and neutralized with aqueous sodium carbonate. The toluene layer was separated, washed with water, and the toluene recovered by distillation at atmospheric pressure. The residue from this preliminary distillation was fractionally distilled under reduced pressure whereby there was obtained 37 grams of N-cyclohexyl-N-2-chloroallyl-crotonamide as a colorless liquid boiling at 131°–135° C. at 1.5 mm. pressure and having the specific gravity of 1.084 at 25°/25° C. This compound was relatively insoluble in water and somewhat soluble in 95 per cent ethanol, carbon tetrachloride, and kerosene.

Example 2

17.34 grams (0.1 mol) of N-cyclohexyl-2-chloroallylamine and 14.04 grams (0.1 mol) of benzoyl chloride were mixed together and 25 milliliters of 5N aqueous sodium hydroxide added thereto portionwise and with vigorous agitation. The resulting product was washed with water and recrystallized from cyclohexane to obtain 11.5 grams of N-cyclohexyl-N-2-chloroallyl-benzamide as a white crystalline product melting at 63°–64° C. This compound was insoluble in water and soluble in carbon tetrachloride, 95 per cent ethanol, and kerosene.

Example 3

34.6 grams (0.2 mol) of N-cyclohexyl-2-chloroallylamine and 25 milliliters of acetic anhydride were mixed together and heated to boiling temperature and under partial reflux for several hours. During the reaction, acetic acid was distilled out of the reaction zone as formed. The resultant product was washed with water and fractionally distilled to obtain 21 grams of N-cyclohexyl-N-2-chloroallylacetamide boiling at 119°–121° C. at 1.5 mm. pressure and having a density of 1.089 grams per milliliter at 25° C. This compound was insoluble in water and very soluble in carbon tetrachloride, 95 per cent ethanol, and kerosene.

By substituting hexanoic acid, cyclohexanoic acid, phenyl acetic acid, stearic acid, hexenoic acid, oleic acid, cresotinic acid, 4-tertiarybutylphenyl acetic acid, or alpha-naphthyl acetic acid, or the acid chlorides or anhydrides thereof for the crotonic acid, benzoyl chloride, and acetic anhydride shown in the examples, the corresponding N-cyclohexyl-2-chloroallyl amides of these acids may be obtained.

The new amides may be employed in combination with insecticidal plant extracts as constituents of either dusts or sprays. Thus a solid finely divided carrier may be impregnated with rotenone and one or more of the N-cyclohexyl-N-2-chloroallyl amides, and used as an insecticidal dust. Similarly, pyrethrum or a mixture of pyrethrum and rotenone may be employed in combination with the amides in dust compositions. Representative of the carriers which may be utilized are diatomaceous earth, pyrophyllite, bentonite, wood flour, or talc. The amide is generally incorporated into such composition in the amount of from about 1 per cent to 5 per cent by weight. Where the dust mixtures are to be employed as concentrates and dispersed in water to form sprays, the amide content may run from about 3 to 30 per cent by weight.

In a further embodiment of the invention the toxicant mixtures may be employed as constituents of aqueous spray compositions or dissolved in organic solvents. The amide content of aqueous sprays may vary from about 0.001 per cent to 3 per cent by weight. In organic solvent solutions, preferred concentrations are from about 1 to about 5 per cent by weight. Suitable solvents include kerosene, alcohol, methyl-ethyl ketone, chlorinated solvents, etc. The mixtures of toxicant may also be employed in oil-in-water type emulsions.

The following example is illustrative of one manner in which the mixed toxicants may be employed. The determinations as therein described were carried out in accordance with the well known Peet-Grady procedure for the control of houseflies.

Example 4

A pyrethrin solution consisting of the extract of the toxic principle from ½ pound pyrethrum flowers dissolved in 1 U. S. gallon of a petroleum distillate having a boiling range of 345°–508° F. and a flash point of 137° F. was employed as the basic composition to determine the effectiveness of combinations of pyrethrins and N-cyclohexyl-N-2-chloroallyl amides against houseflies. This basic composition gave a knockdown of 97 per cent in 10 minutes and a kill of 20 per cent in 24 hours against houseflies.

A composition containing 3 per cent by weight of N-cyclohexyl-N-2-chloroallyl-acetamide dissolved in the pyrethrin solution gave a knockdown of 100 per cent in 10 minutes and a kill of 65 per cent in 24 hours. A 3 per cent by weight solution of the amide in the petroleum distillate employed as carrier for the pyrethrin gave a knockdown of 95 per cent in 10 minutes and a kill of 30 per cent in 24 hours.

In a similar determination with compositions comprising N-cyclohexyl-N-2-chloroallyl-benzamide, the combination of toxicants gave a knockdown of 100 per cent in 10 minutes and a kill of 63 per cent in 24 hours. A 3 per cent by weight solution of the benzamide compound alone gave a knockdown of 93 per cent in 10 minutes and a kill of 36 per cent in 24 hours.

When N-cyclohexyl-N-2-chloroallyl-crotonamide was employed to modify the pyrethrin composition, the mixture of toxicants gave a knockdown of 100 per cent in 10 minutes and a kill of 50.2 per cent in 24 hours. The amide alone gave a knockdown of 98 per cent in 10 minutes and a kill of 28 per cent in 24 hours.

While the above example is concerned solely with the control of houseflies, it is to be understood that compositions comprising the mixture of toxicants may be similarly employed for the control of other insect and mite pests such as red spider, pea aphis, mosquitoes, cockroaches, thrips, aphis rumicis, etc.

We claim:

1. An insecticidal composition comprising as active toxicants an N-cyclohexyl-N-2-chloroallyl amide having the formula

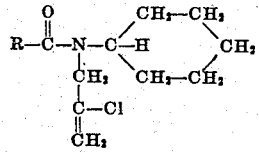

wherein R represents a hydrocarbon radical selected from the group consisting of alkyl, cycloalkyl, aryl, aralkyl, and alkenyl, and a product of the class consisting of pyrethrin and rotenone.

2. An insecticidal spray comprising a petroleum distillate having dissolved therein pyrethrin and an N-cyclohexyl-N-2-chloroallyl amide having the formula

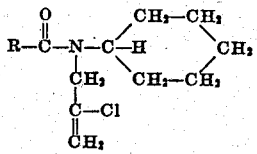

wherein R represents a hydrocarbon radical selected from the group consisting of alkyl, cycloalkyl, aryl, aralkyl, and alkenyl.

3. An insecticidal composition comprising as active toxicants pyrethrin and N-cyclohexyl-2-chloroallyl-acetamide.

4. An insecticidal composition comprising as active toxicants pyrethrin and N-cyclohexyl-N-2-chloroallyl-benzamide.

5. An insecticidal composition comprising as active toxicants pyrethrin and N-cyclohexyl-N-2-chloroallyl-crotonamide.

GERALD H. COLEMAN.
WESLEY D. SCHROEDER.
GERALD A. GRIESS.